US010771120B2

(12) United States Patent
Li et al.

(10) Patent No.: US 10,771,120 B2
(45) Date of Patent: Sep. 8, 2020

(54) BASE STATION FRONT END PREPROCESSING

(71) Applicant: Apple Inc., Cupertino, CA (US)

(72) Inventors: Guangjie Li, Beijing (CN); Wenting Chang, Beijing (CN); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 892 days.

(21) Appl. No.: 15/074,951

(22) Filed: Mar. 18, 2016

(65) Prior Publication Data

US 2016/0315674 A1 Oct. 27, 2016

(30) Foreign Application Priority Data

Apr. 27, 2015 (WO) ................ PCT/CN2015/077533

(51) Int. Cl.
*H04B 7/0413* (2017.01)
*H04L 25/03* (2006.01)
*H04L 25/02* (2006.01)

(52) U.S. Cl.
CPC ....... *H04B 7/0413* (2013.01); *H04L 25/0228* (2013.01); *H04L 25/03343* (2013.01); *H04L 25/03891* (2013.01)

(58) Field of Classification Search
CPC .............. H04B 7/0413; H04L 25/0228; H04L 25/03343
See application file for complete search history.

(56) References Cited

U.S. PATENT DOCUMENTS

| 2003/0103003 A1* | 6/2003 | Ferreol ..................... G01S 3/74 342/387 |
| 2014/0072298 A1* | 3/2014 | Hou ................... H04B 10/0773 398/16 |
| 2015/0023266 A1* | 1/2015 | Imamura ............. H04W 72/042 370/329 |

OTHER PUBLICATIONS

Liu et al, "Optimized Uplink Transmission in Multi-Antenna C-RAN with Spatial Compression and Forward", Jan. 2015, https://arxiv.org/pdf/1501.04764.pdf (Year: 2015).*
3GPP, "Technical Specification Group Radio Access Network; Evolved Universal Terrestrial Radio Access (E-UTRA); Base Station (BS) radio transmission and reception (Release 12)," 3GPP TS 36.104 V12.7.0 (Mar. 2015), Lte Advanced, 155 pages.
3GPP, "Technical Specification Group Radio Access Network; Study on 3D channel model for LTE (Release 12)," 3GPP TR 36.873 V12.1.0 (Mar. 2015), 42 pages.
Doug Lung, "ZTE and China Mobile Test World's First 'Pre-5G' Massive MIMO Base Station," TVTechnology, Nov. 24, 2014, web address: https://www.tvtechnology.com/opinions/zte-and-china-mobile-test-worlds-first-pre5g-massive-mimo-base-station, 2 pages.
Li et al., "Architecture of GPP based, scalable, large-scale C-RAN BBU pool," Conference Paper, Dec. 3-7, 2012, Conference: Globecom Workshops (GC Wkshps), 2012 IEEE, Anaheim, CA, USA, 6 pages.

* cited by examiner

*Primary Examiner* — Siming Liu
(74) *Attorney, Agent, or Firm* — Fish & Richardson P.C.

(57) ABSTRACT

Embodiments of the present disclosure describe systems, devices, and methods for preprocessing in a base station of a multiple-input multiple-output (MIMO) wireless system. In embodiments, remote radio unit (RRU) circuitry may control radio communication related to the MIMO wireless system, including applying a user equipment (UE)-specific spatial filter.

22 Claims, 7 Drawing Sheets

BASE STATION FRONT END PREPROCESSING

RELATED APPLICATION

This application claims priority under 35 U.S.C. § 119 from PCT application no. PCT/CN2015/077533, filed Apr. 27, 2015.

FIELD

Embodiments of the present disclosure generally relate to the field of wireless communication, and more particularly, to methods and apparatuses for preprocessing in a base station of a multiple-input multiple-output (MIMO) wireless system.

BACKGROUND

Massive MIMO wireless systems, such as embodiments of fifth generation (5G) wireless systems, may include very large or massive numbers of antenna elements or antennas (e.g., at least twenty). Such systems can provide better performance and capacity gain over MIMO systems such as fourth generation Long Term Evolution (4G LTE), which may include 2 or 4 antennas. However, issues may arise in the operation of base stations in massive MIMO wireless systems. The base stations may include one or more baseband units (BBUs) and one or more remote radio units (RRUs, sometimes referred to as a base station front end). Issues in the operation of such base stations may relate to complexity of precoder calculation and large matrix manipulation within one or more BBUs, and bandwidth requirements between BBUs and RRUs.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
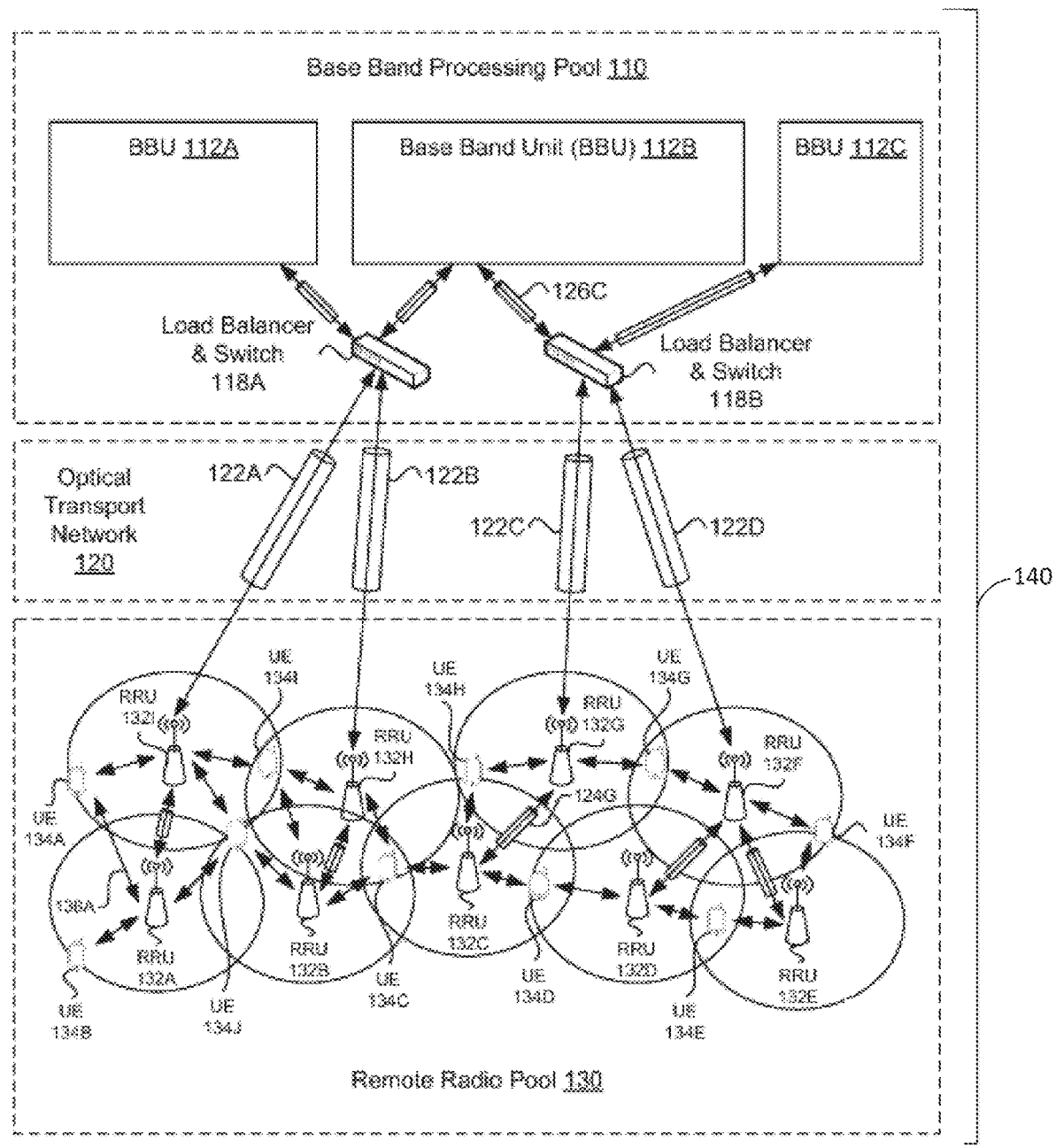
FIG. 1 is a diagram of an example operating environment in which systems and/or methods described herein may be implemented in accordance with some embodiments.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrases "A or B," "A/B," and "A and/or B" mean (A), (B), or (A and B).

In some base station designs, an antenna with a radio frequency (RF) unit may be integrated in an RRU, which may be installed on top of a tower, and the in-phase/quadrature (I/Q) antenna data may be sampled and transported by fiber to a BBU, which is normally installed somewhere on the ground near the tower for easy maintenance and upgrade. In 20 megahertz (MHz) LTE 4 antenna system, I/Q data rate may be about four gigabits per second (Gbps). But for 5G system with 128 antenna system, each with 100 MHz of bandwidth, the corresponding data rate could be about 629 Gbps. The huge amount of input/output (I/O) data may be associated with an ultra-high-cost fiber connection.

Another option may be to integrate RRU and BBU functions together on top of the tower. However, this may result in a "fat" antenna that may face a critical issue of maintenance and upgrade, and present dangerous conditions for operators that would have to climb up the tower to repair and upgrade the BBU.

Another option to reduce I/O burden is to use analog beamforming, by which a digital spatial stream is limited to a small number (for example, eight for LTE). Analog beamforming technology may then be used to spot several beams to construct virtual sectors, similar to cell split by massive antenna. However, this kind of approach may suffer performance loss of massive antenna system, which can enjoy Zero-forcing like matrix algorithm to separate large number of users by spatial fading channel.

The embodiments of the present disclosure may provide techniques and systems that accommodate the large I/O data rate while keeping the benefits and gains of full digital massive MIMO operation.

In particular, illustrative embodiments of the present disclosure include, but are not limited to, methods, systems, computer-readable media, and apparatuses that may provide preprocessing within a front end of a base station or an evolved NodeB (eNB) of a MIMO wireless system, such as a massive MIMO wireless system. In embodiments, the preprocessing may be performed within one or more RRUs and may include application of a user equipment (UE)-specific spatial filter, such as in connection with a downlink (DL) user equipment (UE)-specific precoder. Such preprocessing may reduce complexity of precoder calculation and large matrix manipulation within one or more BBUs, and bandwidth requirements between BBUs and RRUs.

FIG. 1 is a diagram of an example operating environment in which systems and/or methods described herein may be implemented. As illustrated, the operating environment may include a MIMO system. In some embodiments, the MIMO system may include a very large number of antennas (for example, over 20 antennas and possibly up to hundreds of antennas) and may be referred to as a massive MIMO system. The MIMO system may include a baseband processing pool 110 of one or more BBUs 112 (e.g. BBUs 112A-112C) that may communicate over a transport network 120 of one or more electrical or optical fiber cables 122 (e.g., optical fiber cables 122A-122D) with a remote radio pool 130 of one or more RRUs 132 (e.g. RRUs 132A-132I) that each may service a large number of antennas 136 (e.g., twenty or more).

BBUs 112 of baseband processing pool 110, optical fiber cables 122 of transport network 120, and RRUs 132 of remote radio pool 130 together may operate as a base station of a wireless wide area or cellular network, such as an evolved NodeB (eNB) 140, which is in radio communication with multiple user equipments (UEs) 134 (e.g., UEs 134A-134J). In embodiments, the radio communication may employ 5G wireless standards and/or protocols. It will be appreciated that the numbers of BBUs 112, RRUs 132 and UEs 134 shown are merely illustrative and that in embodiments different numbers could be employed. In embodiments, the BBUs 112 of baseband processing pool 110 may be located together or centralized. The BBUs 112 may be coupled to load balancer and switches 118A and 118B via electrical or optical cabling 126. The RRUs 132 may be separated from the BBUs 112 and, in embodiments, may be located with or adjacent to antennas 136. In some embodiments, the BBUs 112 may be located at a base of a tower while the RRUs 132 may be located on top of the tower with or adjacent to the antennas 136.

Figure 2:
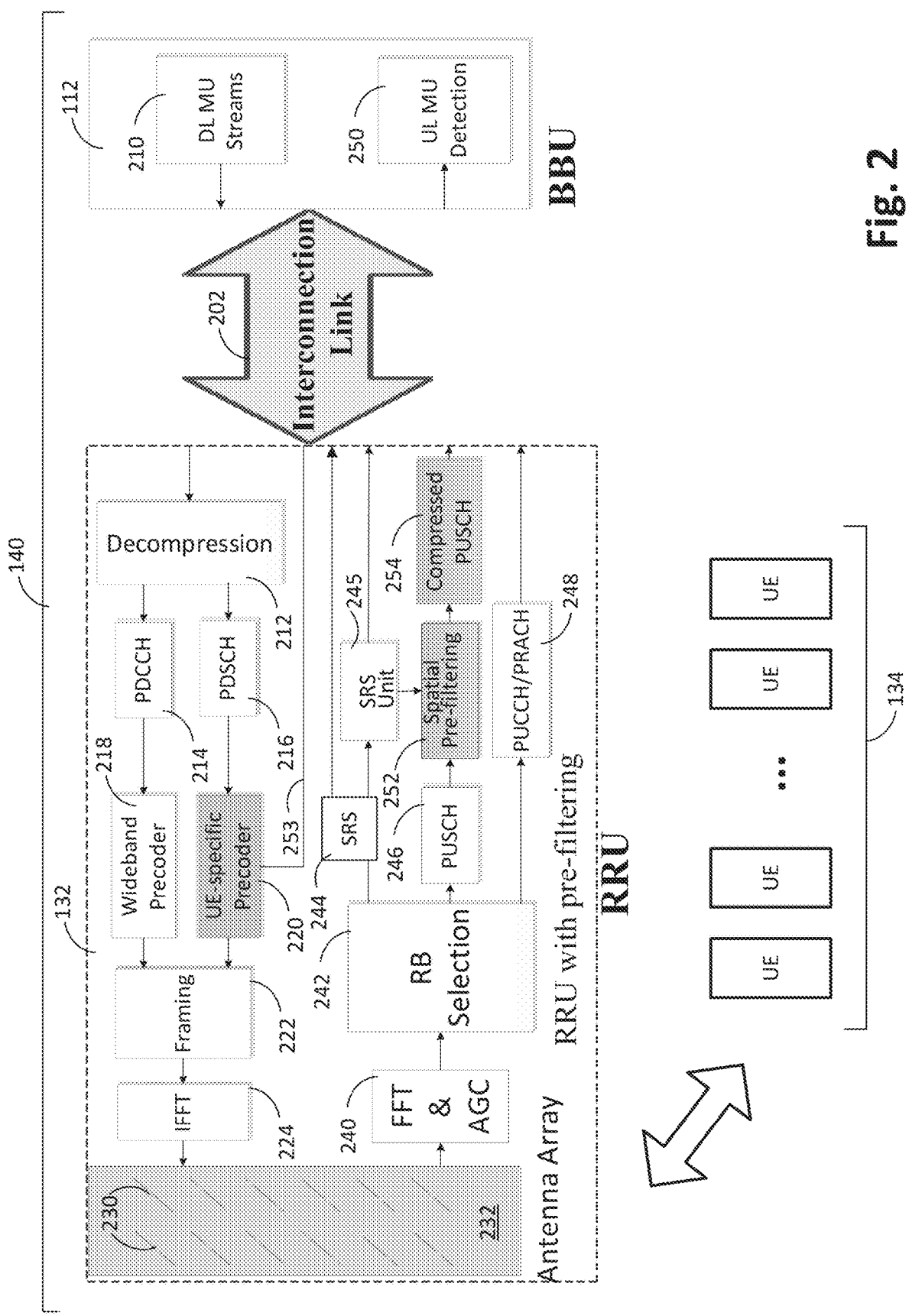
FIG. 2 is a diagram illustrating an embodiment of an evolved Node B (eNB) with BBU in communication with RRU via an interconnection link.

FIG. 2 is a diagram illustrating an embodiment of eNB 140 with BBU 112 in communication with RRU 132 via an interconnection link 202. Interconnection link 202 may include, for example, any or all of load balancer and switches 118, cabling 126, and/or transport network 120, as shown in FIG. 1. For downlink, BBU 112 may provide compressed downlink (DL) multiple-user (MU) streams 210 over interconnection link 202 to RRU 132 for downlink to multiple UEs 134. RRU 132 may include a decompression unit 212 to decompress multiple-user streams 210 to provide a physical downlink control channel (PDCCH) 214 and a physical downlink shared channel (PDSCH) 216. PDCCH 214 may pass to a wideband precoder 218, and PDSCH 216 may pass to a UE-specific precoder 220.

Wideband precoder 218 may apply to PDCCH 214 a wideband precoding so as to generate a wideband beam by which UEs 134 within a coverage area can receive the PDCCH correctly. UE-specific precoder 220 may apply to PDSCH 216 a UE-specific precoding that is specific to the UE 134 to which the PDSCH 216 is to be transmitted and may correspond to and compensate for characteristics of the channel between RRU 132 and the specific UE 134. A framing unit 222 may receive the wideband-precoded PDCCH and the UE-specific-precoded PDSCH and may join them in a signal subframe structure that may pass to an inverse fast Fourier transform unit 224 and then to multiple antennas 230 of an antenna array 232 for downlink to UEs 134.

For uplink, RRU 132 may include a fast Fourier transform and automatic gain control 240 that receives uplink signals from antennas 230 and provides Fourier transformed and gain-controlled uplink signals to a resource block (RB) selection unit 242. RB selection unit 242 may provide a sounding reference signal (SRS) 244, a physical uplink shared channel (PUSCH) 246, and a physical uplink control channel (PUCCH)/physical random access channel (PRACH) 248. The PUCCH/PRACH 248 may pass to the BBU 112 via interconnection link 202 as part of uplink multi-user detection 250. The PUSCH 246 may pass through a UE-specific spatial pre-filtering unit 252, which may include and apply a conjugate of the channel of a specific UE 134 to provide a compressed PUSCH 254 to BBU 112 via interconnection link 202, as another part of the uplink multiple-user detection 250. The SRS 244 may pass to the BBU 112 via interconnection link 202 as another part of the uplink multiple-user detection 250, or may pass to an SRS unit 245. SRS unit 245 may determine from SRS 244 a conjugate of the channel of a specific UE 134 as an estimated spatial filter precoder matrix, which may be delivered to and applied by a spatial pre-filtering unit 252. BBU 112 may determine the conjugate channel of a specific UE 134 from SRS 244, if SRS 244 is passed to BBU 112.

Downlink multiple-user streams 210 transmitted from BBU 112 to RRU 132 may include spatial data streams (e.g., PDCCH 214 and PDSCH 216) that are destined for UEs 134, as well as one or more precoding matrices via a connection 253 to be applied by either or both of wideband precoder 218 and UE-specific precoder 220. Beamforming may include wideband precoder 218 and UE-specific precoder 220 multiplying corresponding precoding matrices and data streams PDCCH 214 and PDSCH 216, respectively. In such embodiments, the data rate between BBU 112 and RRU 132 may be proportional to the number of data streams, rather than the number of antennas 230.

Uplink data received from antennas 230 may be pre-filtered by UE-specific spatial prefiltering unit 252, such that the antenna data may be converted to spatial stream data with a data rate that is proportional to the number of uplink multiple user streams. The conjugate of a channel of a specific UE 134 may be determined from SRS 244 as an estimated spatial filter precoder matrix, which may be determined in RRU 132 by SRS unit 245 or, in some embodiments, in BBU 112. The estimated spatial pre-filter for each UE 134 may be used to construct a downlink precoder matrix for use in UE-specific precoder 220.

Embodiments may provide one or more preprocessing operations within RRU 132, rather than within BBU 112. The one or more preprocessing operations may include or be provided by any or all of UE-specific precoder 220 on downlink and UE-specific spatial pre-filtering unit 252 and SRS unit 245 on uplink. Such preprocessing at RRU 132 may greatly reduce bandwidth requirements (e.g., I/O) of interconnection link 202 between BBU 112 and RRU 132 and can maintain performance gains of a massive MIMO wireless system. With such preprocessing at RRU 132, for example, bandwidth requirements of interconnection link 202 between BBU 112 and RRU 132 may be proportional to the number of spatial streams Ns. In contrast, without such pre-processing by RRU 132, bandwidth requirements may be proportional to the number of antenna Na. Normally in a massive MIMO system, Na may be much larger than Ns.

Figure 3:
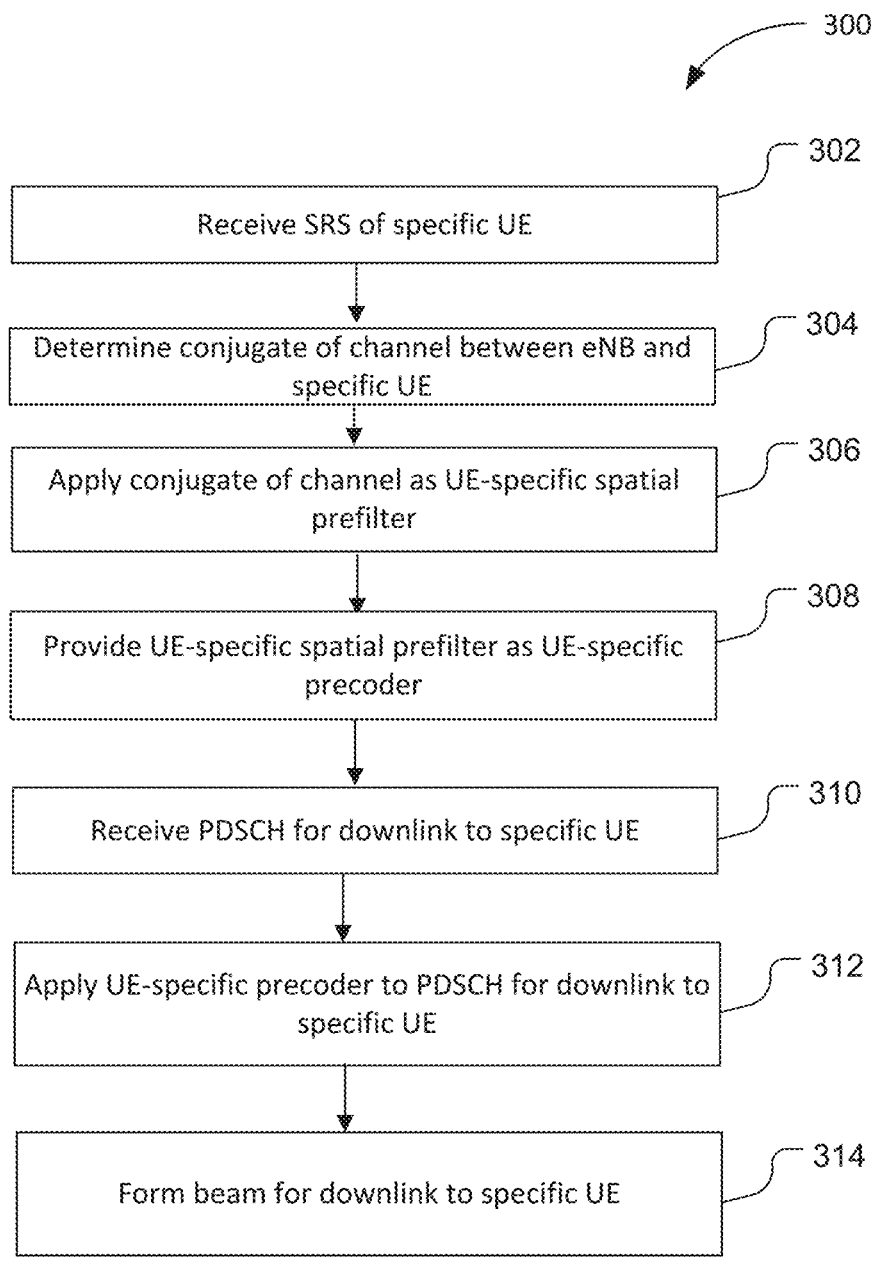
FIG. 3 is a flowchart describing operations of an eNB in accordance with some embodiments.

FIG. 3 is a flowchart 300 describing operations of an eNB in accordance with some embodiments.

At 302, the RRU of an eNB may receive the SRS of a specific UE. In embodiments, RRU 132 may receive the SRS of a specific UE 134.

At 304, a conjugate of the channel between the eNB and the specific UE may be determined from the SRS of the specific UE. In embodiments, SRS unit 245 of RRU 132 may determine from an uplinked SRS 244 a conjugate of the channel of a specific UE 134.

At 306, the conjugate of the channel between the eNB and the specific UE may be applied as a UE-specific spatial prefilter. In embodiments, a conjugate of the channel of a specific UE 134 may be delivered to and applied by a spatial pre-filtering unit 252 as an estimated spatial filter precoder matrix.

At 308, the UE-specific spatial prefilter may be provided as a UE-specific precoder. In embodiments, RRU 132 may include UE-specific precoder 220, which may provide precoding that may correspond to and compensate for characteristics of the channel between RRU 132 and the specific UE 134.

At 310, the RRU of the eNB may receive from the BBU a PDSCH for downlink to the specific UE. In embodiments, BBU 112 and RRU 132 may be positioned apart from each other and RRU 132 may receive a PDSCH from BBU 112 over an interconnection link 202.

At 312, the UE-specific precoder may be applied to the PDSCH for downlink to the specific UE. In embodiments, UE-specific precoder 220 may apply the UE-specific precoding to PDSCH 216.

At 314, a beam may be formed for downlink to the specific UE. In embodiments, beams may be formed at multiple antennas 230 of a massive MIMO system, which may have 20 or more antennas 230 in an antenna array 232.

Figure 4:
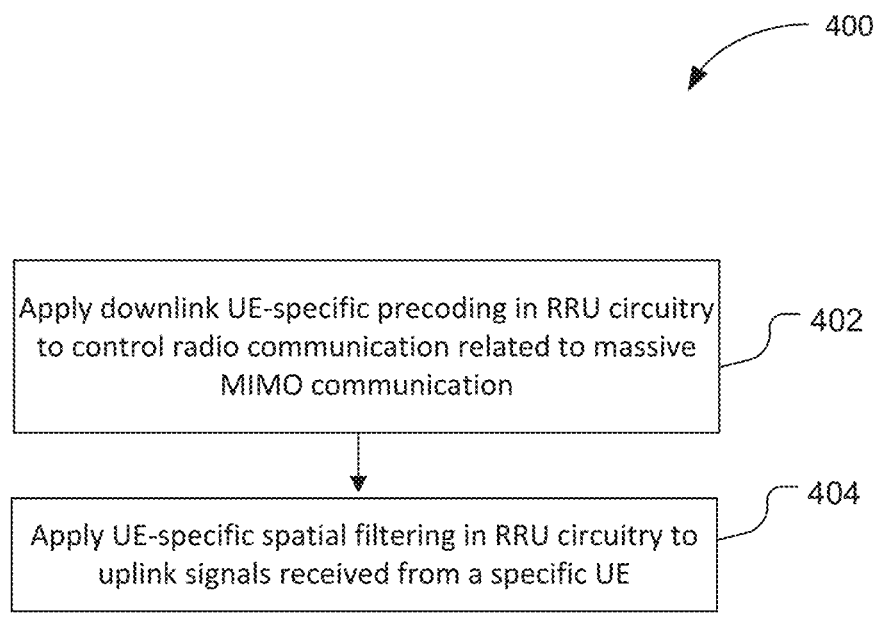
FIG. 4 is a flowchart describing operations of an eNB in accordance with other embodiments.

FIG. 4 is a flowchart 400 describing operations of an eNB in accordance with other embodiments.

At 402, downlink (DL) user equipment (UE)-specific precoding may be applied in RRU circuitry to control radio communication related to massive MIMO communication. In embodiments the massive MIMO communication may include at least twenty antennas and the UE-specific precoding may be applied in connection with DL beamforming.

At 404, UE-specific spatial filtering may be applied in RRU circuitry to uplink signals received from a specific UE. In embodiments, UE-specific spatial filtering may be applied to a PUSCH to provide a compressed PUSCH.

In embodiments, aspects of uplink processing may be described in the following manner. An eNB 140 may include NR-number of receive antennas 230 and may serve K-number of UEs 134 concurrently. Channel frequency response on an ith subcarrier between UEk and a receive antenna Rxn may be denoted as $H_{n,k,i}$, and the transmit symbol of UEk may be denoted as xk. After cyclic prefix (CP) removal and a fast Fourier transform (FFT), a frequency domain receive signal at the antenna Rxn may be represented as to:

$$Y_{n,i} = \sum_{k=0}^{K-1} H_{n,k,i} x_{k,i} + w_{n,i} \quad (1)$$

where $w_{n,i}$ is Gaussian noise. For simplification, the subscript i may be omitted. Then the receive signal may then be simplified to:

$$Y_n = \sum_{k=0}^{K-1} H_{n,k} x_k + w_n. \quad (2)$$

Adopting minimum mean square error (MMSE) equalization, the post-filtering W at the receiver may be represented as:

$$W = H^H (HH^H + \sigma_w^2 I)^{-1} \quad (3)$$
$$= (H^H H + \sigma_w^2 I)^{-1} H^H$$

where $H=[H_0 H_1 \ldots H_{k-1}]$, $H_k=[H_{0,k} \ldots H_{n,k} \ldots H_{N_R-1,k}]^T$ and $\sigma^2$ is a variance of noise. After equalization, detected symbols may be represented as:

$$\hat{x} = WY \quad (4)$$
$$= (H^H H + \sigma_n^2 I)^{-1} H^H Y$$

where $\hat{x}=[\hat{x}_0 \ldots \hat{x}_k \ldots \hat{x}_{K-1}]^T$ contains detected symbols of all UEs 134, and $Y=[Y_0 \ldots Y_{N_R-1}]^T$ may be obtained by stacking all receive signals of all antennas 230. The above detection may be separated into two steps to provide:

step1: $\overline{Y}=H^H Y$ (5)

step2: $\hat{x}=(H^H H+\sigma_n^2 I)^{-1} \overline{Y}$ (6)

In step 1, the receive signal Y may be multiplied by a pre-filtering matrix, which may be a conjugation of the channel between the eNB 140 and a specific UE 134. The $N_R \times 1$ receive signal Y may then be transformed into the K×1 vector $\overline{Y}$, which may be sent from RRU 132 to BBU 112 for demodulation in step 2. Transmit symbols may be detected in step 2 by interference cancellation among multiple UEs 134. This equalization, which may include the operating first step at or in RRU 132 may significantly reduce interconnection bandwidth requirements between BBU 112 and RRU 132 without loss of performance.

The SRS 244 may be transmitted from a UE 134 for channel quality measurement, which can be utilized to calculate the UE-specific pre-filtering matrices. When several UEs 134 send their respective SRSs concurrently, a UE-specific cyclic phase shift may be applied to distinguish them. Thus, in embodiments, channel estimation for a specific UE 134 may be applied at the RRU 132 based on SRS 244, and the UE-specific pre-filtering may be calculated by conjugating the estimated channel. In embodiments, the channel estimation may be based on or employ a discrete cosine transform (DCT), a discrete Fourier transform (DFT), and/or Wienner-filtering.

Following such pre-filtering, the received signal for BBU 112 on a specific subcarrier may be a K×1 vector, $Y=[\overline{Y}_0 \ldots \overline{Y}_k \ldots \overline{Y}_{K-1}]^T$, where $$\overline{Y}_k = \sum_{k'=0}^{K-1} H_k^H H_{k'} x_{k'} + \overline{w}_k,$$

and $\overline{w}_k$ is the combined noise. Rewritten in matrix form, the signal may be represented as $$\overline{Y} = \overline{H}x + \overline{w} \quad (7)$$

where $\overline{H}$ is the combined channel information.

$$\overline{H} = \begin{bmatrix} H_0^H H_0 & H_0^H H_1 & \ldots & H_0^H H_{K-1} \\ H_1^H H_0 & H_1^H H_1 & \ldots & H_1^H H_{K-1} \\ \ldots & \ldots & \ldots & \ldots \\ H_{K-1}^H H_0 & H_{K-1}^H H_1 & \ldots & H_{K-1}^H H_{K-1} \end{bmatrix} \quad (8)$$

In embodiments, BBU 112, rather than RRU 132, may estimate channel information of a specific UE 134 based on a receive signal $\overline{Y}$ and a demodulation reference signal (DMRS). Based on the estimated combined channel information, the interference among different UEs can be eliminated and the transmitted symbols may be detected according to equation (9).

$$\hat{x} = (\overline{H} + \sigma_w^2 I)^{-1} \overline{Y} \quad (9)$$

The transmit bits may be obtained by decoding and descrambling on $\hat{x}$.

A link level simulation may be used to evaluate performance impact of described embodiments on uplink for a multi-user MIMO receiver. The simulation may employ channel parameters based on 3GPP Technical Report (TR) 36.873, version 12.1.0, dated Mar. 26, 2015, and simulation parameters based on 3GPP TR 36.104, version 12.7.0, dated Mar. 28, 2015.

Figure 5:
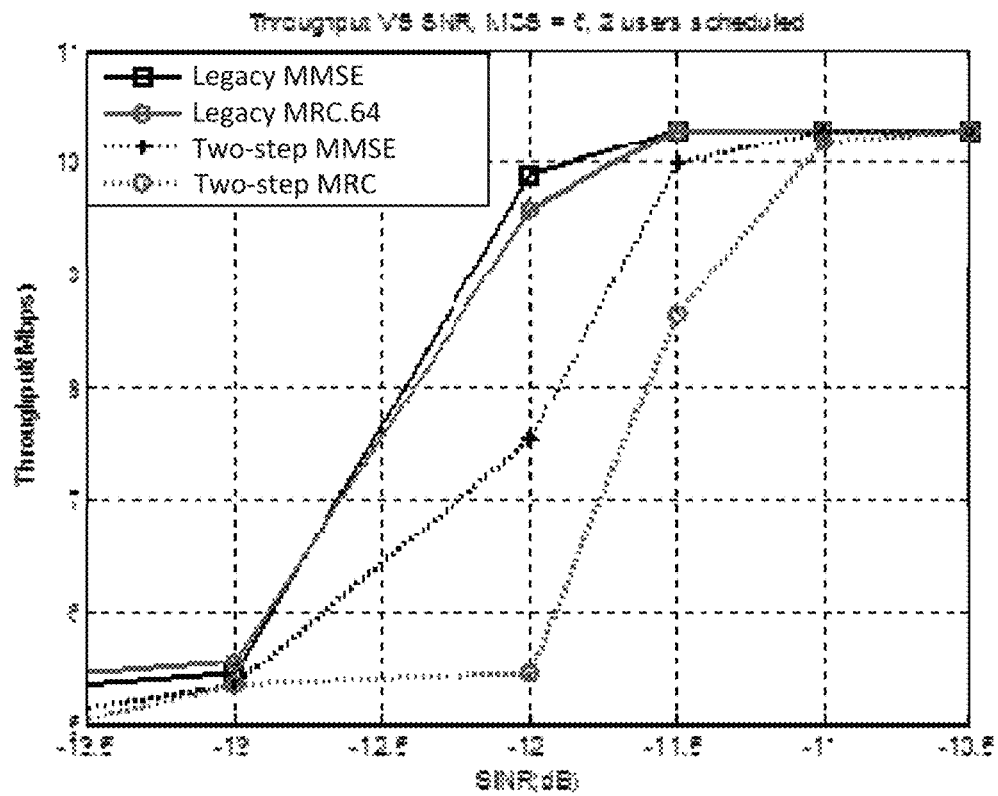
FIG. 5 is a graph illustrating simulation of throughput versus signal-to-interference-plus-noise ratio (SINR) of uplink for example multi-user MIMO receivers.

FIG. 5 is a graph illustrating throughput in megabits per second (Mbps) versus signal-to-interference-plus-noise ratio (SINR) in dB from a link level simulation of uplink for an example multi-user MIMO receiver for legacy MMSE, legacy equalization with maximal ratio combining (MRC), and embodiments of two-step equalization, such as two-step MMSE as described and two-step MRC. The graph of FIG. 5 may be based on a simulation with modulation and coding scheme (MCS) index of 6, 64 receiving antennas, 2 users/scheduling, and an SRS period of 10 mS.

The graph of FIG. 5 shows, for example, that two-step MMSE may have less than 0.5 dB performance loss at package error ratio (PER) of 0.1 These results reflect pre-filtering that is based upon UE-specific channel information, which may be estimated at RRU 132 based on SRSs 244, rather than DMRSs. Inaccuracy may be delivered to the compressed PUSCH, and may degrade some performance. However, in embodiments with massive MIMO uplinks, a large receiver diversity gain may improve uplink performance much more than downlink transmit diversity. As a result, slight uplink level loss will not be an issue with regard to overall system performance. For example, the graph of FIG. 5 shows working SINR could be as low as −10 dB in uplink.

Figure 6:
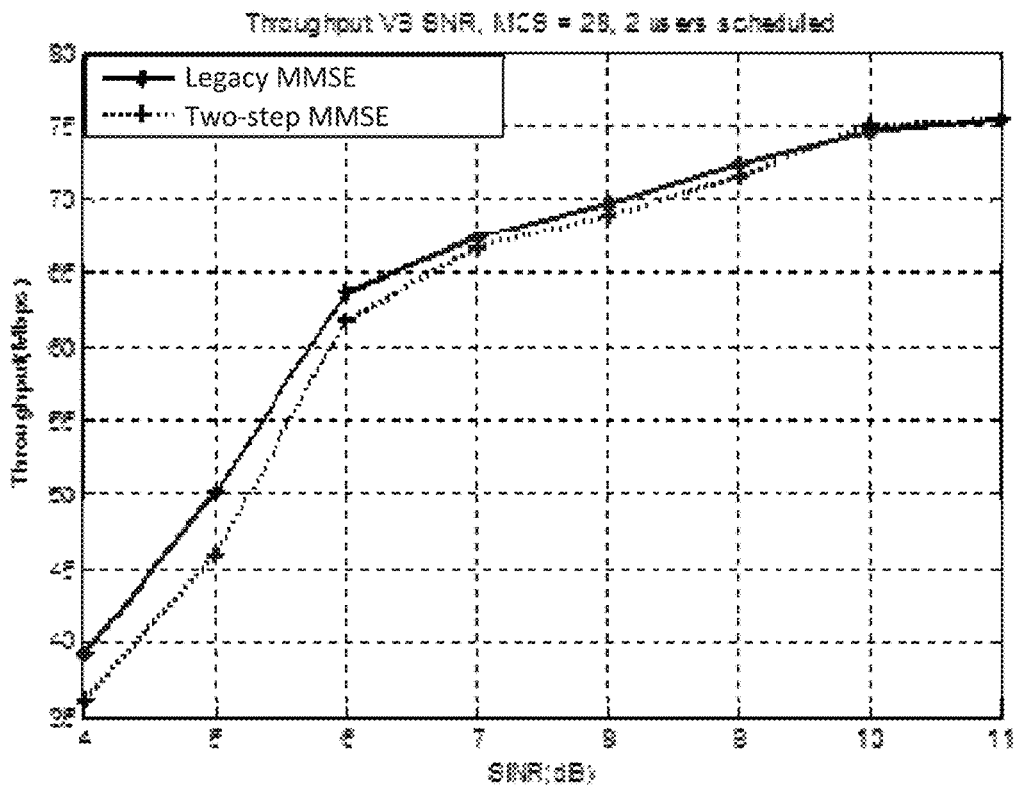
FIG. 6 is a graph illustrating another simulation of throughput versus signal-to-interference-plus-noise ratio (SINR) of uplink for example multi-user MIMO receivers.

FIG. 6 is a graph illustrating throughput in Mbps versus SINR in dB from a link level simulation of uplink for an example multi-user MIMO receiver for legacy MMSE and two-step MMSE, as described, based on MCS index of 28, 64 receiving antennas, 2 users/scheduling, and an SRS period of 10 ms. The graph of FIG. 6 shows that at higher SINR, estimation error will decrease so that performance of two-step MMSE, as described may achieve performance similar to that of legacy MMSE.

Figure 7:
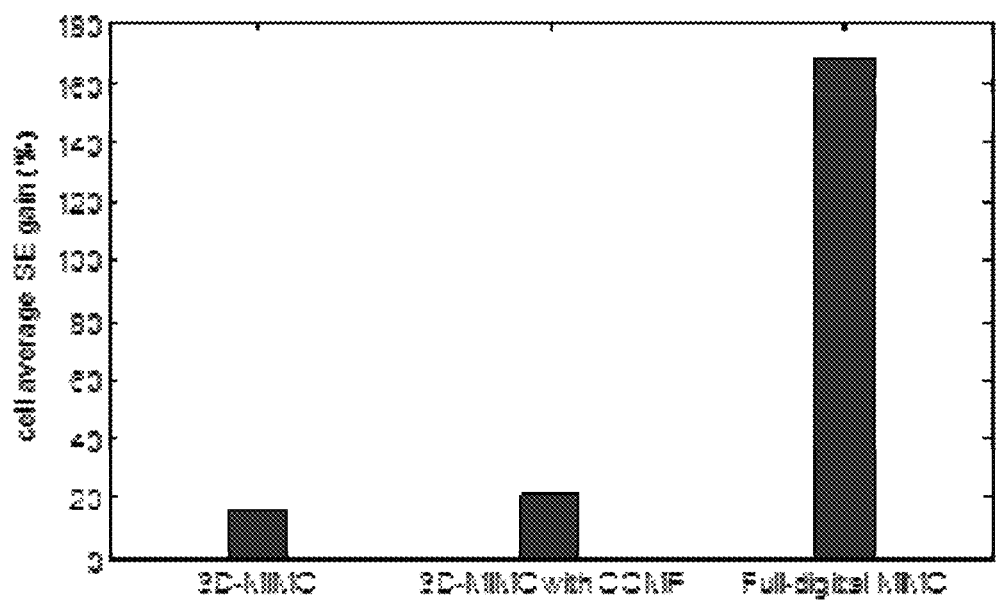
FIG. 7 is a graph illustrating cell-average spectral efficiency (SE) gain for example embodiments of MIMO systems.

Embodiments described herein may be used in and/or support a full-digital beamforming in a MIMO system, which may be distinct from analog beamforming in a 3D MIMO system and/or a 3D MIMO system with compensation. FIG. 7 is a graph illustrating cell-average spectral efficiency (SE) gain, as percentages, for example embodiments of 3D-MIMO, 3D-MIMO with (Comp)ensation, and full-digital MIMO. The graph of FIG. 7 shows that full-digital MIMO may provide cell-average SE gain of about 170%, in comparison to cell-average SE gains of less than or about equal to 20% for 3D-MIMO and 3D-MIMO with Comp, respectively, indicating the increased information or data rate over a given bandwidth that may be provided by full-digital MIMO.

Figure 8:
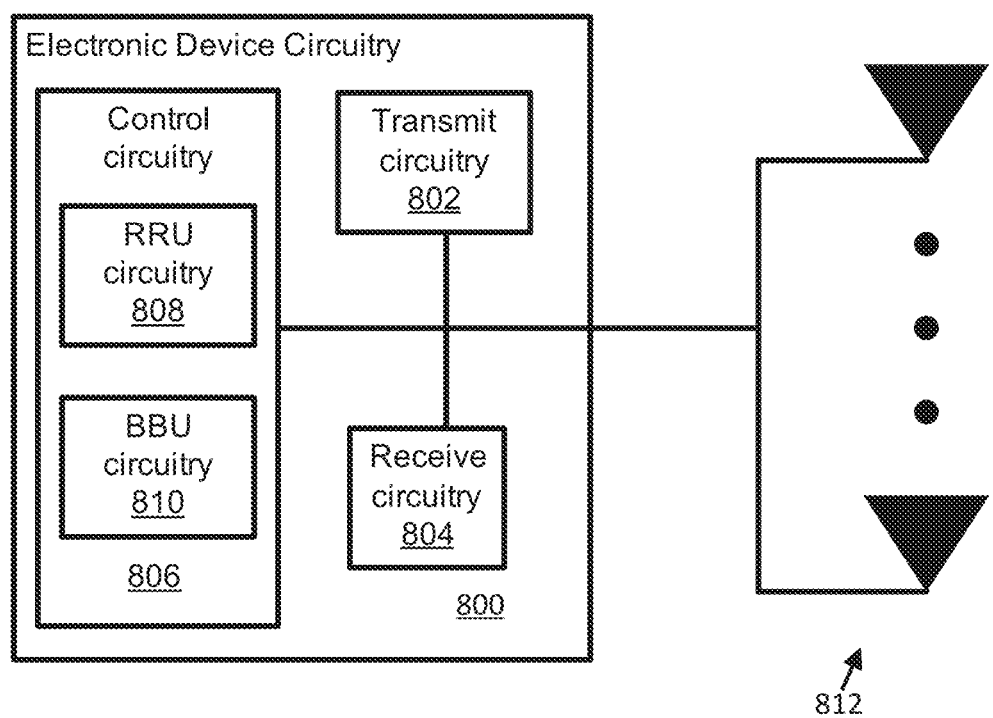
FIG. 8 illustrates electronic device circuitry that may be included in or associated with an eNB.

FIG. 8 illustrates electronic device circuitry 800 that may be included in or associated with an eNB. In embodiments, the electronic device circuitry 800 may include radio transmit circuitry 802 and receive circuitry 804 coupled to control circuitry 806. The control circuitry 806 may include RRU circuitry 808 and/or BBU circuitry 810, as shown, while in other embodiments the RRU circuitry 808 and/or BBU circuitry 810 may be separate from the control circuitry 806. In embodiments, the transmit circuitry 802 and/or receive circuitry 804 may be elements or modules of transceiver circuitry, as shown. The electronic device circuitry 800 may be coupled with one or more plurality of antenna elements of one or more antennas 812. The electronic device circuitry 800 and/or the components of the electronic device circuitry 800 may be configured to perform operations similar to those described elsewhere in this disclosure.

In embodiments where the electronic device circuitry is an eNB or is part of or otherwise incorporated into an eNB that is configured to perform massive MIMO operations, the RRU circuitry 808 may be to perform one or more radio related processes related to the massive MIMO operations. The BBU circuitry 810 may be to perform one or more baseband related processes or operations, which may include baseband demodulation related to the massive MIMO operations and/or forming or processing of user data streams.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 9:
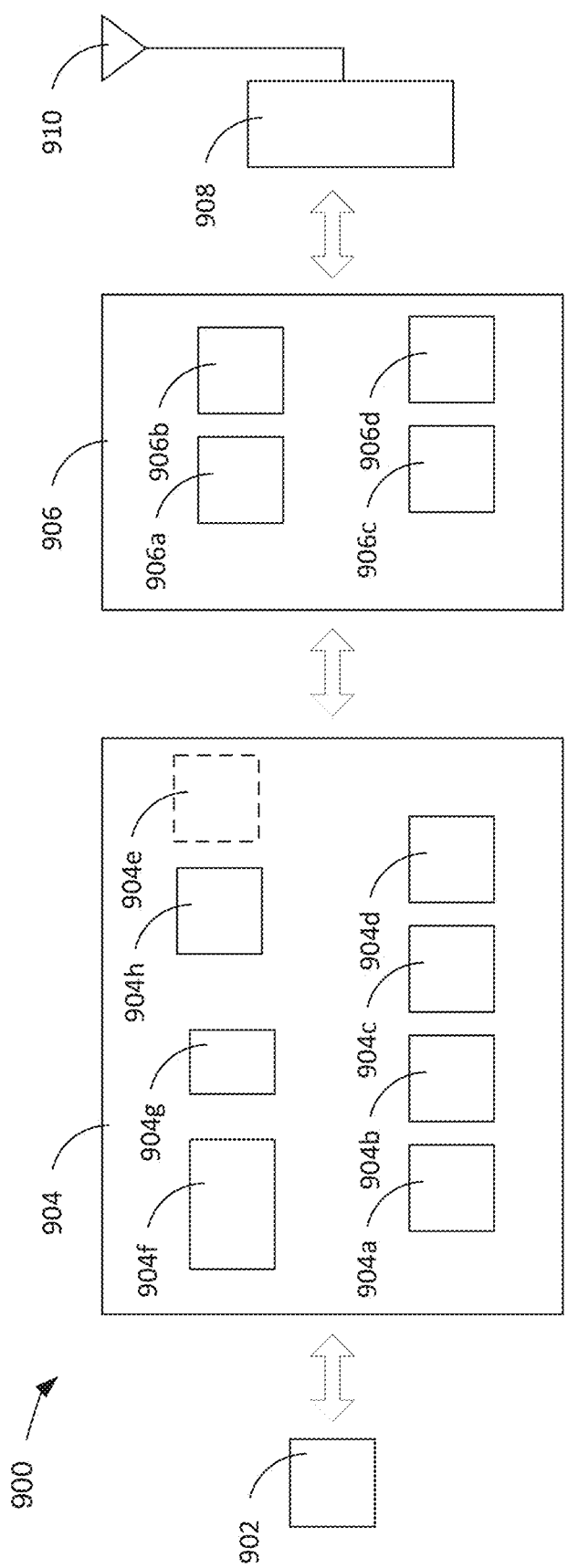
FIG. 9 illustrates, for one embodiment, example components of an electronic device that may implement, be incorporated into, or otherwise be a part of a UE, an eNB, or some other suitable electronic device.

Embodiments described herein may be implemented into a system using any suitably configured hardware and/or software. FIG. 9 illustrates, for one embodiment, example components of an electronic device 900. In embodiments, the electronic device 900 may be, implement, be incorporated into, or otherwise be a part of a UE, an eNB, or some other suitable electronic device. In some embodiments, the electronic device 900 may include application circuitry 902, baseband circuitry 904, radio frequency (RF) circuitry 906, front-end module (FEM) circuitry 908 and one or more antennas 910, coupled together at least as shown. In embodiments, baseband circuitry 904 or portions of it may be included in or operate in connection with BBU 112, and RF circuitry 906 or portions of it may be included in or operate in connection with RRU 132.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuity 904 may interface with the application circuitry 902 for generation and processing of the baseband signals and for controlling operations of the RF circuitry 906. For example, in some embodiments, the baseband circuitry 904 may include a second generation (2G) cellular baseband processor 904a, third generation (3G) cellular baseband processor 904b, fourth generation (4G) cellular baseband processor 904c, and/or other cellular baseband processor(s) 904d for other existing generations, generations in development or to be developed in the future (e.g., fifth generation (5G), 6G, etc.). In embodiments, the electronic device 900 may implement, be incorporated into, or otherwise be a part of a UE that may include a WLAN (e.g., Wi-Fi) baseband processor or circuitry 904e. The baseband circuitry 904 (e.g., one or more of cellular baseband processors 904a-d and, in embodiments, a WLAN baseband processor 904e) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904f of the baseband circuitry 904 may be configured to run elements of the protocol stack for signaling of the PHY, MAC, RLC, PDCP and/or RRC layers. In some embodiments, the baseband circuitry 904 may include one or more audio digital signal processor(s) (DSP) 904g. The audio DSP(s) 904g may be include elements for compression/decompression and echo cancellation and may include other suitable processing elements in other embodiments.

The baseband circuitry 904 may further include memory/storage 904h. The memory/storage 904h may be used to load and store data and/or instructions for operations performed by the processors of the baseband circuitry 904. Memory/storage for one embodiment may include any combination of suitable volatile memory and/or non-volatile memory. The memory/storage 904h may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 904h may be shared among the various processors or dedicated to particular processors.

Components of the baseband circuitry 904 may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature downconversion and/or upconversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a of the transmit signal path may be arranged for direct downconversion and/or direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the electronic device 900 may include additional elements such as, for example, memory/storage, display, camera, sensor, and/or input/output (I/O) interface.

In some embodiments, the electronic device 900 may be configured to perform one or more methods, processes, and/or techniques, or one or more portions thereof, as described herein.

Some non-limiting examples are provided below.

Example 1 may include an evolved NodeB (eNB), comprising remote radio unit (RRU) circuitry to control radio communication related to multiple-input multiple-output (MIMO) operation, including application of a user equipment (UE)-specific spatial filter; and baseband unit (BBU) circuitry coupled with the RRU circuitry to control baseband operation related to the MIMO operation.

Example 2 may include the eNB of example 1, or any other example herein, wherein the RRU circuitry may include a downlink (DL) user equipment (UE)-specific precoder to facilitate DL beamforming by the eNB.

Example 3 may include the eNB of example 2, or any other example herein, wherein operation of the DL UE-specific precoder may include application of a UE-specific conjugate channel.

Example 4 may include the eNB of example 2, or any other example herein, wherein the BBU circuitry is further to determine a UE-specific conjugate channel related to the UE-specific spatial filter and to transmit the UE-specific conjugate channel to the RRU circuitry.

Example 5 may include the eNB of any of examples 1-4, or any other example herein, wherein the RRU circuitry is further to apply the UE-specific spatial filter to an uplink (UL) data channel.

Example 6 may include the eNB of example 5, or any other example herein, wherein the UL data channel may include a physical uplink shared channel (PUSCH).

Example 7 may include the eNB of any of examples 1-6, or any other example herein, wherein the RRU circuitry is further to receive a UL sounding reference signal (SRS) and estimate the UE-specific spatial filter based on the SRS.

Example 8 may include the eNB of example 7, or any other example herein, wherein the estimate of the UE-specific spatial filter may include a conjugate channel of the UE.

Example 9 may include the eNB of any of examples 1-6, or any other example herein, wherein the eNB is to implement a MIMO wireless system having at least twenty antennas.

Example 10 may include or more computer-readable media having instructions stored thereon, wherein the instructions, in response to execution by a device, cause the device to: apply downlink (DL) user equipment (UE)-specific precoding in remote radio unit (RRU) circuitry to control radio communication in DL beamforming related to a multiple input, multiple output (MIMO) system having at least twenty antennas; and apply UE-specific spatial filtering in the RRU circuitry to uplink signals received from a specific UE.

Example 11 may include the one or more computer-readable media of example 10, or any other example herein, wherein the DL UE-specific precoding may include application of the UE-specific spatial filtering.

Example 12 may include the one or more computer-readable media of examples 10 or 11, or any other example herein, and may further include instructions to: receive a UL sounding reference signal (SRS); and estimate the UE-specific spatial filter based on the SRS.

Example 13 may include the one or more computer-readable media of example 12, or any other example herein, wherein the estimate of the UE-specific spatial filter may include a conjugate channel of the UE.

Example 14 may include remote radio unit (RRU) circuitry, comprising: a decompression unit to receive and decompress multiple user streams from a baseband unit; a downlink (DL) user equipment (UE)-specific precoder to compensate for characteristics of a channel between the RRU and a specific UE; and an uplink (UL) UE-specific spatial filter for a physical uplink shared channel (PUSCH).

Example 15 may include the circuitry of example 14, or any other example herein, wherein the DL UE-specific precoder includes application of the UE-specific spatial filter in connection with DL beamforming.

Example 16 may include the circuitry of either of examples 14 or 15, or any other example herein, and may further include a sounding reference signal (SRS) unit to receive a UL SRS and estimate the UE-specific spatial filter based on the SRS.

Example 17 may include the circuitry of example 16, or any other example herein, wherein the estimate of the UE-specific spatial filter includes a conjugate channel of the UE.

Example 18 may include the circuitry of any of examples 14-17, or any other example herein, wherein the circuitry is to control radio communication related to a massive multiple-input multiple-output (MIMO) system with at least twenty antennas.

Example 19 may include the circuitry of any of examples 14-17, or any other example herein, wherein the DL UE-specific precoder further is to receive the UE-specific spatial filter from a baseband unit.

Example 20 may include an evolved NodeB (eNB) to perform massive multiple-input multiple-output (MIMO) operation, the eNB comprising: remote radio unit (RRU) circuitry to perform one or more radio related processes related to the massive MIMO operation, wherein the one or more radio related processes include a downlink (DL) user equipment (UE)-specific precoding process; and baseband unit (BBU) circuitry coupled with the RRU circuitry, the BBU circuitry to perform baseband demodulation related to the massive MIMO operation.

Example 21 may include the eNB of example 20, or any other example herein, wherein the DL UE-specific precoding process is related to DL beamforming by the eNB.

Example 22 may include the eNB of example 20, or any other example herein, wherein the BBU circuitry is further to determine a UE-specific conjugate channel related to the DL UE-specific precoding process and transmit the UE-specific conjugate channel to the RRU circuitry.

Example 23 may include the eNB of any of examples 20-22, or any other example herein, wherein the RRU circuitry is further to perform a spatial pre-filtering function.

Example 24 may include the eNB of example 23, or any other example herein, wherein the spatial pre-filtering function is to compress data in an uplink (UL) data channel.

Example 25 may include a method, comprising: applying downlink (DL) user equipment (UE)-specific precoding in remote radio unit (RRU) circuitry to control radio communication in DL beamforming related to a multiple input, multiple output (MIMO) system having at least twenty antennas; and applying UE-specific spatial filtering in the RRU circuitry to uplink signals received from a specific UE.

Example 26 may include the method of example 25, or any other example herein, wherein the DL UE-specific precoding includes application of the UE-specific spatial filtering.

Example 27 may include the method of either of examples 25 or 26, or any other example herein, and may further include receiving a UL sounding reference signal (SRS); and estimating the UE-specific spatial filter based on the SRS.

Example 28 may include the method of example 27, or any other example herein, wherein estimating the UE-specific spatial filter includes determining a conjugate channel of the UE.

Example 29 may include an apparatus, comprising: means to control radio communication related to multiple-input multiple-output (MIMO) operation, including application of a user equipment (UE)-specific spatial filter; and means to control baseband operation related to the MIMO operation.

Example 30 may include the apparatus of example 29, or any other example herein, further including a downlink (DL) user equipment (UE)-specific precoder to facilitate DL beamforming by the apparatus.

Example 31 may include the apparatus of example 30, or any other example herein, further including means to determine a UE-specific conjugate channel related to the UE-specific spatial filter.

Example 32 may include the apparatus of any of examples 29-31, or any other example herein, wherein application of the user equipment (UE)-specific spatial filter includes applying the UE-specific spatial filter to an uplink (UL) data channel.

Example 33 may include the apparatus of example 32, or any other example herein, wherein the UL data channel includes a physical uplink shared channel (PUSCH).

Example 34 may include the apparatus of any of examples 29-33, or any other example herein, further including: means to receive a UL sounding reference signal (SRS) and to estimate the UE-specific spatial filter based on the SRS.

Example 35 may include the apparatus of example 34, or any other example herein, wherein the estimate of the UE-specific spatial filter includes a conjugate channel of the UE.

Example 36 may include the apparatus of any of examples 29-33, or any other example herein, wherein the apparatus is to implement a MIMO wireless system having at least twenty antennas.

Example 37 may include a method, comprising: applying downlink (DL) user equipment (UE)-specific precoding to control radio communication in DL beamforming related to a multiple input, multiple output (MIMO) system having at least twenty antennas; and applying UE-specific spatial filtering to uplink signals received from a specific UE.

Example 38 may include the method of example 37, or any other example herein, wherein the DL UE-specific precoding includes application of the UE-specific spatial filtering.

Example 39 may include the method of either of examples 37 or 38, or any other example herein, further including: receiving a UL sounding reference signal (SRS); and estimating the UE-specific spatial filter based on the SRS.

Example 40 may include the method of example 39, or any other example herein, wherein the estimate of the UE-specific spatial filter includes a conjugate channel of the UE.

Example 41 may include an apparatus, comprising: means to perform one or more radio related processes related to the massive MIMO operation, wherein the one or more radio related processes include a downlink (DL) user equipment (UE)-specific precoding process; and means to perform baseband demodulation related to the massive MIMO operation.

Example 42 may include the apparatus of example 41, or any other example herein, wherein the DL UE-specific precoding process is related to DL beamforming by the eNB.

Example 43 may include the apparatus of example 41, or any other example herein, further including means to determine a UE-specific conjugate channel related to the DL UE-specific precoding process.

Example 44 may include the apparatus of any of examples 41-43, or any other example herein, further including means to perform a spatial pre-filtering function.

Example 45 may include the apparatus of example, wherein the spatial pre-filtering function is to compress data in an uplink (UL) data channel.

Example 46 may include one or more computer-readable media having instructions stored thereon, wherein the instructions, in response to execution by a device, cause the device to: apply downlink (DL) user equipment (UE)-specific precoding to control radio communication in DL beamforming related to a multiple input, multiple output (MIMO) system having at least twenty antennas; and apply UE-specific spatial filtering to uplink signals received from a specific UE.

Example 47 may include the one or more computer-readable media of example 46, or any other example herein, wherein the DL UE-specific precoding includes application of the UE-specific spatial filtering.

Example 47 may include the one or more computer-readable media of either of examples 46 or 47, or any other example herein, further including instruction to: receive a UL sounding reference signal (SRS); and estimate the UE-specific spatial filter based on the SRS.

Example 49 may include the one or more computer-readable media of example 48, or any other example herein, wherein the estimate of the UE-specific spatial filter includes a conjugate channel of the UE.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. A base station, comprising:
   remote radio unit (RRU) circuitry to control radio communication related to multiple-input multiple-output (MIMO) operation, including application of a user equipment (UE)-specific spatial filter,
   wherein the RRU circuitry includes a downlink (DL) user equipment (UE)-specific precoder to facilitate DL beamforming by the base station; and
   baseband unit (BBU) circuitry coupled with the RRU circuitry to control baseband operation related to the MIMO operation.

2. The base station of claim 1, wherein operation of the DL UE-specific precoder includes application of a UE-specific conjugate channel.

3. The base station of claim 1, wherein the BBU circuitry is further to determine a UE-specific conjugate channel related to the UE-specific spatial filter and to transmit the UE-specific conjugate channel to the RRU circuitry.

4. The base station of claim 1, wherein the RRU circuitry is further to apply the UE-specific spatial filter to an uplink (UL) data channel.

5. The base station of claim 4, wherein the UL data channel includes a physical uplink shared channel (PUSCH).

6. The base station of claim 1, wherein the RRU circuitry is further to:
   receive a UL sounding reference signal (SRS); and
   estimate the DE-specific spatial filter based on the SRS.

7. The base station of claim 6, wherein the estimate of the UE-specific spatial filter includes a conjugate channel of the UE.

8. The base station of claim 1, wherein the eNB is to implement a MIMO wireless system having at least twenty antennas.

9. One or more non-transitory, computer-readable media having instructions stored thereon, wherein the instructions, in response to execution by a device, cause the device to:
   apply downlink (DL) user equipment (UE)-specific precoding in remote radio unit (RRU) circuitry to control radio communication in DL beamforming related to a multiple input, multiple output (MIMO) system having at least twenty antennas; and
apply UE-specific spatial filtering in the RRU circuitry to uplink signals received from a specific UE.

10. The one or more non-transitory, computer-readable media of claim 9 wherein the DL UE-specific precoding includes application of the UE-specific spatial filtering.

11. The one or more non-transitory, computer-readable media of claim 10, further including instructions to:
receive a UL sounding reference signal (SRS); and
estimate the UE-specific spatial filter based on the SRS.

12. The one or more non-transitory, computer-readable media of claim 11, wherein the estimate of the UE-specific spatial filter includes a conjugate channel of the UE.

13. Remote radio unit (RRU) circuitry, comprising:
a decompression unit to receive and decompress multiple user streams from a baseband unit;
a downlink (DL) user equipment (UE)-specific precoder to compensate for characteristics of a channel between the RRU and a specific UE; and
an uplink (UL) UE-specific spatial filter for a physical uplink shared channel (PUSCH).

14. The circuitry of claim 13, wherein the DL UE-specific precoder includes application of the UE-specific spatial filter in connection with DL beamforming.

15. The circuitry of claim 13, further including:
a sounding reference signal (SRS) unit to receive a UL SRS and estimate the UE-specific spatial filter based on the SRS.

16. The circuitry of claim 15, wherein the estimate of the UE-specific spatial filter includes a conjugate channel of the UE.

17. The circuitry of claim 13, to control radio communication related to a massive multiple-input multiple-output (MIMO) system with at least twenty antennas.

18. The circuitry of claim 14, wherein the DL UE-specific precoder further is to receive the UE-specific spatial filter from a baseband unit.

19. The circuitry of claim 13, wherein the DL UE-specific precoder receives and is applied to a physical downlink shared channel (PDSCH).

20. The circuitry of claim 19, further including:
a sounding reference signal (SRS) unit to receive a UL SRS and estimate the UE-specific spatial filter based on the SRS.

21. The circuitry of claim 13, further including a wideband precoder to apply wideband precoding to a physical downlink control channel (PDCCH) to provide a wideband-precoded PDCCH.

22. The circuitry of claim 21, wherein the DL UE-specific precoder receives and is applied to a physical downlink shared channel (PDSCH) to provide a UE-specific-precoded PDSCH and the circuitry further includes a framing unit to receive the wideband-precoded PDCCH and the UE-specific-precoded PDSCH to join them in a signal subframe structure.

* * * * *